PHASE SENSITIVE AMPLIFIER

Filed Jan. 30, 1956

INVENTOR.
WOLFGANG MEREL
BY
Herbert J. Smith
ATTORNEY

United States Patent Office 2,941,093
Patented June 14, 1960

2,941,093

PHASE SENSITIVE AMPLIFIER

Wolfgang Merel, Newark, N.J., assignor to Bendix Aviation Corporation, Teterboro, N.J., a corporation of Delaware Filed Jan. 30, 1956, Ser. No. 562,071

10 Claims. (Cl. 307—88.5)

This invention relates to a phase sensitive amplifier employing transistors and having an alternating current output.

It is an object of the present invention to provide novel interstage coupling with phase rejection.

It is a further object of the invention to provide novel coupling for interconnecting two stages of amplification.

A further object is the provision of novel coupling means with phase discrimination from an alternating current signal input to an alternating current output.

Another object is to provide a phase sensitive amplifier having an alternating current input and output, and employing a phase rectifier or phase discriminator for deriving a direct current bias which is selectively applied to transistors and which rejects quadrature.

The present invention contemplates a phase sensitive amplifier having an alternating current output derived from an alternating current signal input. A signal source is connected to the bases of a pair of transistors having the outputs thereof connected to the primary of a coupling transformer. A phase-selective rectifier affords quadrature rejection and provides direct current which is fed selectively through one of a pair of diode switches to provide the collector voltage for said pair of transistors. The output from the phase selective rectifier portion of the phase sensitive amplifier is dependent upon both the magnitude and phase of the signal with respect to an alternating current reference voltage supplied to the phase selective rectifier.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 1:
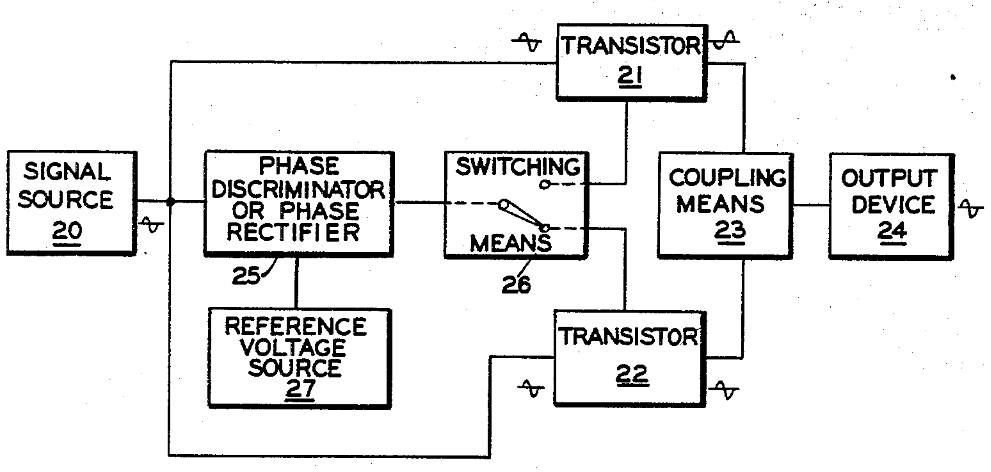
Fig. 1 is a block diagram with wave forms for the phase sensitive amplifier.

Referring to drawings and more particularly to Fig. 1, there is shown an alternating current signal source 20 connected to a pair of transistor amplifiers 21 and 22, with the outputs of said transistor amplifiers being connected to a coupling means 23, which coupling device has its output connected to an output device 24, which may be a motor or the like, usable in a servo system, as a typical example.

A discriminator-rectifier 25, which supplies direct current voltage for biasing said transistors, is coupled to the output of the signal input source 20, and thence to said transistors, selectively, by way of switching means 26. An alternating current reference voltage 27 which is the same frequency as the signal input is connected to said discriminator-rectifier 25.

Figure 2:
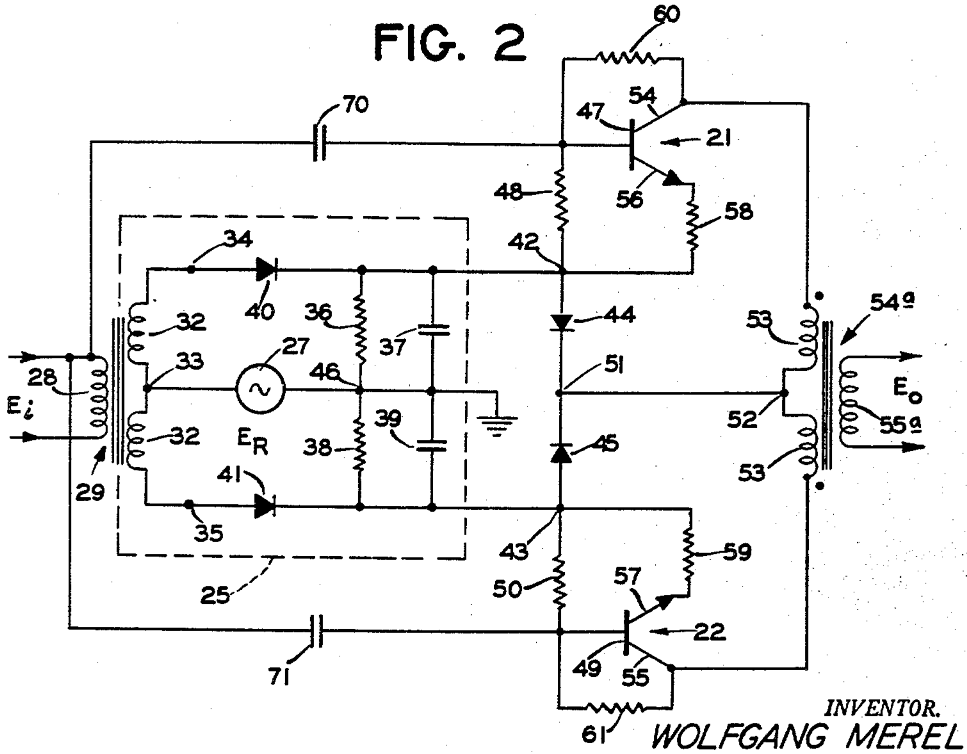
Fig. 2 is a schematic diagram showing one form of circuitry of the amplifier of the invention.

Referring to Fig. 2, the input signal source ($E_i$) is connected to the primary winding 28 of a coupling transformer 29, which transformer also has a secondary winding 32 with a mid-tap terminal 33, and end terminals 34 and 35.

A pair of diodes 40 and 41 each have a respective end thereof, such as the diode plate, connected to terminals 34 and 35, with the opposite ends of said diodes, such as the cathodes thereof, being connected, respectively, to terminals 42 and 43 for providing direct current bias for the transistors. The alternating current reference voltage 27 is connected between terminal 33 and a terminal 46 connected to ground.

The signal input voltage is of the same frequency as the reference voltage and is usually either in phase or 180 degrees out of phase with said reference voltage.

A resistor 36 is connected between the cathode of diode 40 and ground via terminal 46, while a similar resistor 38 is connected from the cathode of diode 41 to ground via terminal 46. A capacitor 37 is in parallel with the resistor 36, while a capacitor 39 similar to capacitor 37 is connected in parallel with resistor 38.

Transistor 21 has its base 47 connected via resistor 48 to terminal 42, while transistor 22 has its base 49 connected via resistor 50 to terminal 43, said resistors being used for supplying suitable direct current bias to their respective transistors. A pair of diode switches 44 and 45 each have one side thereof connected to terminals 42 and 43 while the opposite sides of said diodes are connected to a common terminal 51, which terminal 51 is connected to an electrical mid point or mid-tap terminal 52 of the primary winding 53 of a transformer 54*a* having a secondary winding 55*a* for supplying the output voltage ($E_o$) of the amplifier of the invention.

The collectors 54 and 55 of the transistors 21 and 22, respectively, are connected to the outer ends of the primary winding of the coupling means such as transformer 54*a*. The emitters 56 and 57 of the transistors 21 and 22, respectively, are connected via resistors 58 and 59, respectively, to terminals 42 and 43, respectively. A resistor 60 shunts the base 47 and the collector 54 of transistor 21, while a resistor 61 shunts the base 49 and the collector 55 of transistor 22.

When the input voltage ($E_i$) is in phase with the reference voltage ($E_R$), or 180° out of phase therewith, the direct current output of the discriminator-rectifier across terminals 42 and 43 is maximum. When the input voltage ($E_i$) is 90° out of phase, or 270° with respect to the reference voltage ($E_R$), the direct current output across terminals 42 and 43 is zero. The purpose of the discriminator-rectifier is to supply collector voltage for the transistors 21 and 22 with a phase sense, and reject quadrature.

The purpose of resistor 36, and capacitor 37, and similarly resistor 38 and capacitor 39, is for filtering or smoothing the pulsating ripple from the output of diodes 40 or 41, depending on the phase relation of the signal input to the reference voltage.

Diodes 44 and 45 switch the direct current output from the phase selective rectifier, or discriminator-rectifier, to the appropriate transistor collector depending on the polarity of the direct current voltage to cause either diode 44 or 45 to conduct.

Resistors 48, 60 and 58, similarly resistors 50, 61, 59, are for establishing proper base direct current bias for the respective transistors. Resistors 60 and 61 also provide negative feedback for gain stabilization.

Capacitors 70 and 71 block the direct current bias of transistors 21 and 22 from the signal source, $E_i$. The signal source $E_i$ passes to the operating half of the circuit via base 47 or 49, and through ground via capacitors 37 or 39. When either transistor 21 or 22 is conducting, its output appears on the primary 53 of transformer 54a, and in turn is induced in the secondary 55a of said transformer.

The output voltage $E_o$ is always in phase with the input voltage $E_i$. When $E_R$ and $E_i$ are in phase or 180° out of phase, $E_o$ is maximum, and when $E_R$ and $E_i$ are 90° or 270° out of phase, $E_o$ is zero volts, since quadrature is rejected.

Quadrature rejection is obtained by using a phase selective rectifier. Output from this rectifier circuit is dependent upon both magnitude and phase of the signal with respect to the reference voltage. In another version of the same invention, output from the phase selective rectifier is used to operate two transistor common collector circuits by supplying collector voltage. The magnitude of output voltage available when using either the grounded base, collector or emitter configuration is a function of the conduction angle of the rectifiers.

When the signal and reference voltages are in phase, output from the selective rectifier is at a maximum. The polarity of the output is such that one of the switching or shunting diodes conducts and the complete output of the discriminator-rectifier appears as collector voltage for one of the common collector transistor stages. For 180 degree reversal of signal voltage, the other common collector stage operates. When the signal and reference voltages are 90 or 270 degrees out of phase no output is obtained from the phase elective rectifier and consequently the transfer of the stage is zero. The primary of the output coupling transformer 54a is connected in series opposition so as to assure no phase reversal in the output with respect to the input when reference and signal reverse their phase by 180 degrees. The output of the phase sensitive amplifier is alternating current which is always in phase with the input and with rejection characteristics not subject to null variation.

From the foregoing, it will be seen that when the signal input is in-phase or 180° out of phase with the reference voltage, there is an amplified output voltage which is always in phase with the input voltage. Any quadrature is rejected and no signal output results. The circuitry connects the input to the output terminals via both of the transistors. However, only one of the pair of transistors can conduct at a particular time, depending on which of the two diode switches is conducting, which in turn depends on the in-phase or 180° out-of-phase relationship between the input signal and the reference voltage.

While an output transformer is shown as a coupling means for coupling the output of the parallel connected transistors to an output device, it is to be understood that resistance, impedance or any other form of coupling may be used. For example, the output transformer may be eliminated by providing a suitable tap on the signal phase winding of a servo motor. Further, any conventional or convenient device or method may be used to couple the signal input to the phase discriminator or phase rectifier.

Adequate power output can be obtained by means of transistors to drive servo motors, particularly of the small instrument type, without employing critically balanced magnetic amplifier components, and the direct current for biasing the transistors may be derived from a discriminator having a phase sense substantially as shown.

Although but one embodiment of the invention has been illustrated and described in detail, it is to be expressly understood that the invention is not limited thereto. Various changes can be made in the design and arrangements of the parts without departing from the spirit and scope of the invention as the same will now be understood by those skilled in the art.

What is claimed is:

1. A phase sensitive amplifier including transistors and having signal input terminals for connecting to a source of alternating current, phase rectifying means connected to said signal input terminals and having terminals for connecting to a reference voltage for converting a portion of said signal input from alternating current to direct current when said signal input and reference voltage are connected to their respective terminals, and means for selectively applying said direct current to certain of said transistors to provide suitable collector voltage therefore depending on the phase relation of said reference voltage with respect to the signal input, whereby an alternating current output is derived in phase with the signal input.

2. A phase sensitive amplifier including transistors and having signal input terminals for connecting to a source of alternating current, phase rectifying means having terminals for connecting to a reference voltage for converting a portion of said signal input from alternating current to direct current when said signal input and reference voltage are connected to their respective terminals, and diode switching means for selectively applying said direct current to certain of said transistors to provide suitable collector voltage therefore depending on the phase relation of said reference voltage with respect to the signal input.

3. A phase sensitive amplifier including a pair of transistor means and having signal input terminals for connecting to a source of alternating current, phase discriminator means coupled to the signal input terminals, and having terminals for connecting to a reference voltage for converting a portion of said signal input from alternating current to direct current when said signal input and reference voltage are connected to their respective terminals, and means for selectively applying said direct current to one of said transistor means to provide suitable collector voltage therefore, whereby said selected transistor means becomes conductive to provide an output for the phase sensitive amplifier.

4. A phase sensitive amplifier including transistors, a source of alternating current signal input connected thereto, rectifying means including a reference voltage connected to said signal input for converting a portion thereof to direct current, and switching means for selectively applying said direct current to certain of said transistors to provide suitable collector voltage therefore depending on the phase relation of said reference voltage with respect to the signal input.

5. A phase sensitive amplifier including a pair of transistors, a source of alternating current signal input connected thereto, a phase discriminator including an alternating current reference voltage connected to said signal input for converting a portion of said signal input from alternating current to direct current, and diode switching means for selectively applying said direct current to one or the other of said transistors to provide suitable collector voltage therefore depending on the phase relation of said reference voltage with respect to the signal input.

6. An amplifier having a source of signal input connected thereto and an output signal of the same phase as the signal input, said amplifier comprising phase sensitive rectifier means having a reference voltage for phase comparison with said signal input, independent transistor amplifier portions, and switching means selectively coupling the output of said phase sensitive rectifier to one of said transistor amplifier portions depending on the phase of the signal input with respect to said reference voltage, whereby a signal input in-phase or 180° out-of-phase with said reference voltage will result in an output signal in phase with said signal input.

7. An amplifier having a source of signal input connected thereto for deriving an amplified output signal of the same phase as the signal input, said amplifier comprising phase sensitive rectifier means having a reference voltage for phase comparison with said signal input, independent transistor amplifier portions connected between said source of signal input and said output signal, and switching means selectively coupling said rectifier means to one of said transistor amplifier portions depending on the phase of the signal input with respect to said reference voltage, whereby a signal input in-phase or 180° out-of-phase with said reference voltage will result in an output signal in phase with said signal input, and quadrature of the signal input voltage with the reference voltage will result in zero voltage output.

8. A phase sensitive amplifier comprising rectifying means for receiving an alternating current signal and an alternating current reference voltage and providing direct current voltage as determined by the phase of the signal relative to the reference voltage, a pair of transistors actuated by the signal voltage, and switching means for selectively applying the output of the rectifier to collectors of the transistors to render one of the transistors conducting.

9. A phase sensitive amplifier having an input and an output, a discriminator rectifier connected to the input for receiving an alternating current signal and alternating current reference voltage to provide a direct current voltage determined by the relative phases of the signal and reference voltage, a pair of transistors energized by the signal voltage and connected to the output, and switching means connected to the discriminator rectifier and selectively applying the direct current voltage to collectors of the transistors so that an alternating voltage is provided at the output corresponding in magnitude and phase to the signal.

10. A phase sensitive amplifier having an input and an output, a discriminator rectifier connected to the input for receiving an alternating current signal and alternating current reference voltage to provide a direct current voltage determined by the relative phases of the signal and reference voltage, a filter connected to the discriminator rectifier for filtering the direct current voltage, a pair of transistors energized by the signal voltage and connected to the output, and switching means connected to the filter and selectively applying the direct current voltage to collectors of the transistors so that an alternating voltage is provided at the output corresponding in magnitude and phase to the signal.

References Cited in the file of this patent

UNITED STATES PATENTS

| | | |
|---|---|---|
| 2,339,466 | Duft | Jan. 18, 1944 |
| 2,454,807 | Kennedy | Nov. 30, 1948 |
| 2,535,147 | Markusen | Dec. 26, 1950 |
| 2,677,054 | Cohen | Apr. 27, 1954 |
| 2,698,392 | Herman | Dec. 28, 1954 |
| 2,783,380 | Bonn | Feb. 26, 1957 |
| 2,783,384 | Bright et al. | Feb. 26, 1957 |
| 2,809,339 | Guggi | Oct. 8, 1957 |
| 2,832,051 | Raisbeck | Apr. 22, 1958 |

UNITED STATES PATENT OFFICE

CERTIFICATE OF CORRECTION

Patent No. 2,941,093 June 14, 1960

Wolfgang Merel

It is hereby certified that error appears in the printed specification of the above numbered patent requiring correction and that the said Letters Patent should read as corrected below.

Column 3, line 28, for "elective" read -- selective --.

Signed and sealed this 10th day of January 1961.

(SEAL)

Attest:

KARL H. AXLINE
Attesting Officer

ROBERT C. WATSON
Commissioner of Patents